United States Patent
Sano

(10) Patent No.: US 10,466,611 B2
(45) Date of Patent: Nov. 5, 2019

(54) CHARGING ROLLER

(71) Applicant: BRIDGESTONE CORPORATION, Tokyo (JP)

(72) Inventor: Takehiro Sano, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 0 days.

(21) Appl. No.: 16/073,977

(22) PCT Filed: Feb. 1, 2017

(86) PCT No.: PCT/JP2017/003667
§ 371 (c)(1),
(2) Date: Jul. 30, 2018

(87) PCT Pub. No.: WO2017/135324
PCT Pub. Date: Aug. 10, 2017

(65) Prior Publication Data
US 2019/0041767 A1   Feb. 7, 2019

(30) Foreign Application Priority Data
Feb. 1, 2016   (JP) .................................. 2016-017283

(51) Int. Cl.
*G03G 15/02* (2006.01)
*F16C 13/00* (2006.01)
(Continued)

(52) U.S. Cl.
CPC .......... *G03G 15/0233* (2013.01); *F16C 13/00* (2013.01); *G03G 15/1685* (2013.01); *G03G 15/0818* (2013.01)

(58) Field of Classification Search
CPC .......... G03G 15/0233; G03G 15/1685; G03G 15/0818; F16C 13/00
See application file for complete search history.

(56) References Cited

U.S. PATENT DOCUMENTS

| | | | | |
|---|---|---|---|---|
| 6,096,395 A | * | 8/2000 | Hayashi | .............. B29C 44/1242 399/176 |
| 2007/0003331 A1 | * | 1/2007 | Kawano | ............. G03G 15/0818 399/286 |

(Continued)

FOREIGN PATENT DOCUMENTS

| JP | 2008-165214 A | 7/2008 |
|---|---|---|
| JP | 2009-116009 A | 5/2009 |

(Continued)

OTHER PUBLICATIONS

International Search Report for PCT/JP2017/003667 dated Mar. 21, 2017 [PCT/ISA/210].

(Continued)

*Primary Examiner* — Francis C Gray
(74) *Attorney, Agent, or Firm* — Sughrue Mion, PLLC

(57) ABSTRACT

An object of the present invention is to provide a charging roller in which detachment of particles from a surface layer as well as abrasion and scraping of the particles, which are caused by contact and the like with other member such as a photoreceptor during the use, are unlikely to occur. The charging roller includes: a shaft 1; and an elastic layer 2 and a surface layer 3, which are sequentially formed on the outer circumference of the shaft 1. The surface layer 3 is composed of a mixture of a surface layer resin composition and particles, the surface layer resin composition has a tensile elongation at break of 51% or greater, and the particles have a reaction force of 1.0 to 10.3 mN under 1-μm compression.

2 Claims, 3 Drawing Sheets

(51) Int. Cl.
*G03G 15/16* (2006.01)
*G03G 15/08* (2006.01)

(56) References Cited

U.S. PATENT DOCUMENTS

| | | | | |
|---|---|---|---|---|
| 2008/0146427 A1* | 6/2008 | Osaku | ................ | G03G 15/0233 492/56 |
| 2010/0104316 A1* | 4/2010 | Hoshio | .............. | G03G 15/0233 399/100 |
| 2010/0329748 A1* | 12/2010 | Osaka | ................ | G03G 15/0818 399/286 |
| 2013/0223893 A1* | 8/2013 | Hayashi | ............. | G03G 15/0818 399/286 |
| 2013/0295330 A1 | 11/2013 | Kodama et al. | | |
| 2014/0100097 A1* | 4/2014 | Takano | ................... | F16C 13/00 492/56 |
| 2015/0003874 A1* | 1/2015 | Aoyama | ............ | G03G 15/0233 399/176 |
| 2017/0183510 A1 | 6/2017 | Fujisawa et al. | | |
| 2017/0227880 A1* | 8/2017 | Koyanagi | ............. | C08F 226/06 |
| 2017/0285513 A1* | 10/2017 | Fujisawa | ................ | F16C 13/00 |
| 2017/0308000 A1* | 10/2017 | Fujisawa | ................ | F16C 13/00 |

FOREIGN PATENT DOCUMENTS

| | | |
|---|---|---|
| JP | 2009-145798 A | 7/2009 |
| JP | 2012-42700 A | 3/2012 |
| WO | 2013/118576 A1 | 8/2013 |
| WO | 2014/002909 A1 | 1/2014 |

OTHER PUBLICATIONS

Extended European Search Report dated Dec. 17, 2018 issued by the European Patent Office in counterpart application No. 17747478.0.

* cited by examiner

CHARGING ROLLER

CROSS REFERENCE TO RELATED APPLICATIONS

This application is a National Stage of International Application No. PCT/JP2017/003667, filed on Feb. 1, 2017, which claims priority from Japanese Patent Application No. 2016-017283, filed on Feb. 1, 2016.

TECHNICAL FIELD

The present invention relates to a charging roller (hereinafter, may also be simply referred to as "roller"), more particularly a charging roller used for an image forming process performed by an image forming device, such as a copying machine or a printer.

BACKGROUND ART

In image forming devices utilizing an electrophotographic system such as copying machines, fax machines and printers, a variety of roller members (e.g., charging rollers, transfer rollers, toner supply rollers, developing rollers, cleaning rollers, paper-feeding rollers, and pressure rollers for fixation) are used. These roller members generally have a basic structure in which an elastic layer composed of a rubber material or a resin material is supported on the outer circumference of a shaft (core metal).

Depending on the intended use of the roller members, in order to satisfy the required performance, a surface layer is further arranged on the elastic layer to control the roller surface properties. For such a surface layer, conventionally, a flexible material is used so as to suppress cracking and abrasion of the layer itself and, particularly, in charging rollers and developing rollers, in order to adjust the surface roughness for the purposes of, for example, controlling the charging properties, particles are dispersed in the surface layer in some cases. For instance, Patent Document 1 discloses a conductive roller comprising: a shaft; an elastic layer formed on the outer circumference of the shaft; and a resin coating layer formed on the peripheral surface of the elastic layer, wherein the resin coating layer has a glass transition temperature (Tg) of 40° C. or higher and a friction coefficient of 0.5 or less, and it is also disclosed therein that fine particles are incorporated into the resin coating layer.

RELATED ART DOCUMENT

Patent Document

Patent Document 1: Japanese Unexamined Patent Application Publication No. 2008-165214

SUMMARY OF THE INVENTION

Problems to be Solved by the Invention

However, since such roller members come into contact with other members such as a photoreceptor during the use, when particles are dispersed in the surface layer, there are cases where the desired charging performance and the like cannot be attained and problems such as image defects occur due to detachment of particles from a surface layer, or abrasion or scraping of the particles, in association with the use.

In view of the above, an object of the present invention is to solve the above-described problems and provide: a charging roller in which detachment of particles from a surface layer as well as abrasion and scraping of the particles are unlikely to occur.

Means for Solving the Problems

The present inventor intensively studied to discover that the above-described problems can be solved by adopting the below-described constitution, thereby completing the present invention.

That is, the present invention is a charging roller comprising: a shaft; and an elastic layer and a surface layer which are sequentially formed on the outer circumference of the shaft, wherein the surface layer is composed of a mixture of a surface layer resin composition and particles, the surface layer resin composition has a tensile elongation at break of 51% or greater, and the particles have a reaction force of 1.0 to 10.3 mN under 1-μm compression.

In the charging roller of the present invention, it is preferred that the surface layer resin composition contain a urethane resin composed of a polyol having an ester skeleton and an isocyanate having an aromatic ring. Further, in the charging roller of the present invention, it is also preferred that the glass transition temperature (Tg) of the particles be 34° C. or higher.

Effects of the Invention

According to the present invention, a charging roller in which detachment of particles from a surface layer as well as abrasion and scraping of the particles are unlikely to occur can be realized.

MODE FOR CARRYING OUT THE INVENTION

Figure 1:
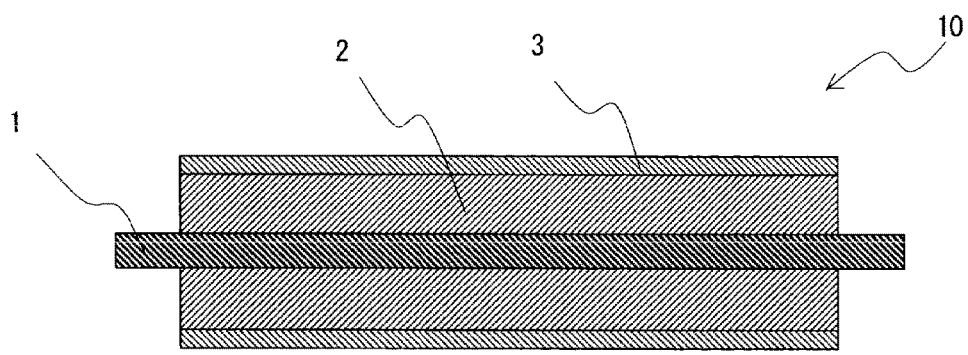
FIG. 1 is an axial cross-sectional view illustrating one example of a charging roller of the present invention.

Embodiments of the present invention will now be described in detail referring to the drawings.

FIG. 1 is an axial cross-sectional view that illustrates one example of a charging roller of the present invention. As illustrated, a charging roller 10 of the present invention comprises: a shaft 1; and an elastic layer 2 and a surface layer 3, which are sequentially formed on the outer circumference of the shaft 1.

In the roller 10 of the present invention, it is important that the surface layer 3 be composed of a mixture of a surface layer resin composition and particles, that the surface layer resin composition have a tensile elongation at break of 51% or greater; and that the particles have a reaction force of 1.0 to 10.3 mN under 1-μm compression. By defining prescribed conditions for the resin composition and the particles that constitute the surface layer 3, detachment of the particles from the surface layer 3 and abrasion of the particles that occur in association with the use can be suppressed, so that deterioration of image performance during endurance use can be inhibited. That is, by using a flexible resin composition having a tensile elongation at break of 51% or greater as the resin composition constituting the surface layer, generation of cracks on the surface layer itself upon deformation caused by an external force as well as detachment of the particles can be suppressed. Further, as for the particles, by using such particles that are not excessively soft or hard having a reaction force of 1.0 to 10.3 mN as described above, abrasion and detachment of the particles can both be suppressed. Excessively soft particles cause generation of gaps between the surface layer and the particles during deformation caused by an external force, making the particles likely to be detached. Meanwhile, when soft particles are used, the particles are deformed when the roller is pressed against a photoreceptor, and this leads to an increase in the contact area between the particles and the photoreceptor; however, when the particles are excessively hard and the contact area is thus small, since the particles are subjected to a greater force, abrasion thereof is more likely to occur. Therefore, by defining the conditions of the resin compositions and the particles that constitute the surface layer 3 in accordance with the present invention, a charging roller having superior abrasion resistance and detachment resistance of particles than conventional charging rollers can be obtained.

In the present invention, the tensile elongation at break of the surface layer resin composition is required to be 51% or greater, preferably 70% to 300%. Generally, a higher elongation leads to an increased flexibility, as well as an increase in the friction coefficient of the surface after curing. An increase in the friction coefficient may make delamination of the elastic layer and the surface layer at their interface more likely to occur. From the standpoint of the adhesion between the elastic layer and the surface layer, the elongation is preferably 300% or less. Further, in the present invention, the particles are required to have a reaction force of 1.0 to 10.3 mN, preferably 2.0 to 10.3 mN, when compressed by 1 μm. From the standpoint of suppressing detachment of the particles, the reaction force is desirably 2.0 to 10.3 mN. It can be said that detachment of the particles presents a greater problem than scraping of the particles with regard to image formation. The tensile elongation at break can be measured in accordance with JIS K6251. Further, the reaction force under 1-μm compression can be measured using a Fischer hardness meter.

(Surface Layer Resin Composition)

In the present invention, the surface layer resin composition may be any resin composition whose tensile elongation at break satisfies the above-described range, and the constituents thereof are not particularly restricted and can be appropriately decided as desired. In the present invention, the surface layer resin composition is preferably formed by using a heat-curable or energy ray-curable urethane resin as a main component. Particularly, examples of the energy ray-curable resin include UV-curable resins, electron beam-curable resins and infrared ray-curable resins, among which UV-curable resins are preferred from the standpoints of reaction rate and energy efficiency. Further, examples of the UV-curable resins include those of a type which uses a radical photopolymerization initiator and those of a type which uses a cationic photopolymerization initiator, among which UV-curable resins of a type which uses a radical photopolymerization initiator are preferred since such resins have a high reaction rate and yield only a small amount of uncured impurities. These urethane resins may be used individually, or two or more thereof may be used in combination.

As the heat-curable or energy ray-curable urethane resin, for example, a urethane (meth)acrylate can be suitably used. The urethane (meth)acrylate is not particularly restricted as long as it has at least one (meth)acryloyl group ($CH_2$=CHCO— or $CH_2$=C($CH_3$)CO—) and at least one urethane bond (—NHCOO—) in one molecule, and the urethane (meth)acrylate may be a monomer or an oligomer and can be selected as appropriate in accordance with the intended purpose. Specific examples thereof include polybutadiene-based urethane (meth)acrylates, carbonate-based urethane (meth)acrylates, ester-based urethane (meth)acrylates, and ether-based urethane acrylates. These may be used individually, or two or more thereof may be used in combination. In the case of a heat-curable urethane resin, the urethane resin may be composed of a polyol (e.g., a polybutadiene-based polyol, a carbonate-based polyol, an ester-based polyol, or an ether-based polyol) and an isocyanate (e.g., isophorone diisocyanate (IPDI), hexamethylene diisocyanate (HDI), toluene diisocyanate (TDI), diphenylmethane diisocyanate (MDI), or xylylene diisocyanate (XDI)).

For the formation of a urethane skeleton, the isocyanate is preferably one obtained using an aromatic isocyanate from the standpoint of improving the abrasion resistance of the surface layer 3. Particularly, a urethane resin composed of a polyol having an ester skeleton and an isocyanate having an aromatic ring is more preferred and, by allowing the surface layer to have an ester skeleton and an aromatic ring in its structure, the abrasion resistance of the surface layer can be further improved.

Further, in the surface layer resin composition, as required, a conventionally known additive(s), such as a thermal polymerization initiator, a photopolymerization initiator, a photopolymerization initiator aid, a catalyst, an antioxidant, an age resistor, a conductive agent, a foam stabilizer, a filler, a peptizing agent, a foaming agent, a plasticizer, a softening agent, a tackifier, an antiblocking agent, a separating agent, a mold release agent, a bulking agent, a colorant, a cross-linking agent, a vulcanizing agent, and/or a polymerization inhibitor, may be incorporated as appropriate. These additives may be used individually, or two or more thereof may be used in combination.

Thereamong, examples of the thermal polymerization initiator include organic peroxides, such as t-butyl hydroperoxide, di-t-butyl peroxide, lauroyl peroxide, benzoyl peroxide, dimyristyl peroxydicarbonate, t-butyl peroxyacetate, t-butyl peroxy(2-ethylhexanoate), and cumyl peroxyoctoate; and azo compounds, such as azobisisobutyronitrile and azobiscyclohexanenitrile. These thermal polymerization initiators may be used individually, or two or more thereof may be used in combination. The thermal polymerization initiator(s) can be incorporated in an amount of 5 parts by mass or less, preferably 2 parts by mass or less, with respect to 100 parts by mass of the heat-curable or energy ray-curable urethane resin.

Examples of the photopolymerization initiator include 4-dimethylaminobenzoic acid; 4-dimethylaminobenzoate; 2,2-dimethoxy-2-phenylacetophenone; acetophenone diethyl ketal; alkoxyacetophenones; benzyl dimethyl ketal; benzophenone derivatives, such as benzophenone, 3,3-dimethyl-4-methoxybenzophenone, 4,4-dimethoxybenzophenone, and 4,4-diaminobenzophenone; alkylbenzoylbenzoates; bis(4-dialkylaminophenyl)ketones; benzyl derivatives, such as benzyl and benzyl methyl ketal; benzoin derivatives, such as benzoin and benzoin isobutyl ether; benzoin isopropyl ether; 2-hydroxy-2-methylpropiophenone; 1-hydroxycyclohexyl phenyl ketone; thioxanthone derivatives, such as xanthone and thioxanthone; fluorene; 2,4,6-trimethylbenzoyldiphenylphosphine oxide; bis(2,6-dimethoxybenzoyl)-2,4,4-trimethylpentylphosphine oxide; bis(2,4,6-trimethylbenzoyl)-phenylphosphine oxide; 2-methyl-1-(4-(methylthio)phenyl)-2-morpholinopropan-1; and 2-benzyl-2-dimethylamino-1-(morpholinophenyl)-butanon-1. Specific examples of the photopolymerization initiator include IRGACURE 907 (manufactured by BASF Japan Ltd.). These photopolymerization initiators may be used individually, or two or more thereof may be used in combination. The photopolymerization initiator(s) can be incorporated in an amount of 5 parts by mass or less, preferably 2 parts by mass or less, with respect to 100 parts by mass of the heat-curable or energy ray-curable urethane resin.

As the conductive agent, any known ion conductive agent or electron conductive agent can be used as appropriate. Particularly, examples of the ion conductive agent include ammonium salts, such as perchlorates, chlorates, hydrochlorides, bromates, iodates, fluoroborates, sulfates, ethylsulfonates, carboxylates and sulfonates of tetraethylammonium, tetrabutylammonium, dodecyltrimethylammonium (e.g., lauryltrimethylammonium), hexadecyltrimethylammonium, benzyltrimethylammonium, modified fatty acid dimethylethylammonium, octadecyltrimethylammonium (e.g., stearyltrimethylammonium), benzyltrimethylammonium, modified fatty acid dimethylethylammonium and the like; and perchlorates, chlorates, hydrochlorides, bromates, iodates, fluoroborates, sulfates, trifluoromethylsulfates and sulfonates of alkali metals and alkaline earth metals, such as lithium, sodium, potassium, calcium and magnesium. Further, examples of the electron conductive agent include conductive carbon blacks, such as Ketjen black and acetylene black;

carbon blacks for rubbers, such as SAF, ISAF, HAF, FEF, GPF, SRF, FT, and MT; carbon blacks for inks, such as oxidized carbon black; other various carbon blacks, such as pyrolytic carbon blacks; natural graphites; artificial graphites; metal oxides, such as antimony-doped tin oxide (ATO), ITO, tin oxide, titanium oxide, and zinc oxide; metals, such as nickel, copper, silver, and germanium; conductive polymers, such as polyaniline, polypyrrole, and polyacetylene; and conductive whiskers, such as carbon whiskers, graphite whiskers, titanium carbide whiskers, conductive potassium titanate whiskers, conductive barium titanate whiskers, conductive titanium oxide whiskers, and conductive zinc oxide whiskers. The conductive agent can be incorporated in an amount of 0.1 to 5 parts by mass, preferably 0.5 to 3 parts by mass, with respect to 100 parts by mass of the heat-curable or energy ray-curable urethane resin.

(Particle Resin Composition)

In the present invention, the particles may be any particles whose reaction force under 1-μm compression satisfies the above-described range, and the constituents thereof are not particularly restricted and can be appropriately decided as desired. In the present invention, a particle resin composition is preferably formed by using a urethane (meth)acrylate as a main component. As the urethane (meth)acrylate, the same ones as those exemplified above for the surface layer resin composition can be used.

In the particle resin composition, in the same manner as in the surface layer resin composition, as required, a conventionally known additive(s), such as a thermal polymerization initiator, a photopolymerization initiator, a photopolymerization initiator aid, a catalyst, an antioxidant, an age resistor, a conductive agent, a foam stabilizer, a filler, a peptizing agent, a foaming agent, a plasticizer, a softening agent, a tackifier, an antiblocking agent, a separating agent, a mold release agent, a bulking agent, a colorant, a cross-linking agent, a vulcanizing agent, and/or a polymerization inhibitor, may be incorporated as appropriate. These additives may be used individually, or two or more thereof may be used in combination. Further, preferred amounts of these additives to be incorporated are also the same as those in the surface layer resin composition.

In the present invention, it is particularly preferred to incorporate a photopolymerization initiator into the surface layer resin composition and a thermal polymerization initiator into the particle resin composition. By incorporating a photopolymerization initiator into the resin portion of the surface layer 3 and forming the surface layer 3 by photocuring, the particles can be made less likely to be detached as compared to a case where the surface layer 3 is formed by heat-curing. This is believed to be also attributed to that, although particles are usually produced by heat-curing, energy ray irradiation of the surface layer 3 containing such particles produced by heat-curing allows photoreactive groups (e.g., (meth)acryloyl groups) remaining on the surfaces of the particles to react quickly, as a result of which the particles and the surface layer resin composition are chemically bound with each other.

Further, in the present invention, it is more preferred to constitute the surface layer resin composition and the particle resin composition with the same resin component by using, as the heat-curable or energy ray-curable urethane resin in the surface layer resin composition, the same urethane (meth)acrylate as the one used in the particle resin composition. In other words, the surface layer 3 is formed by mixing the particles produced from the particle resin composition into the surface layer resin composition whose resin component is the same as that of the particle resin composition. When the particles are softer than the resin portion of the surface layer 3, the particles are likely to be detached; however, by constituting the surface layer resin composition and the particle resin composition using the same resin component, not only the wettability between the particles and the resin at their interface is further improved but also the particles are made less likely to be detached even when they are soft since the surface layer 3 is uniformly deformed under a load, which are preferred.

In the present invention, the particles can be incorporated into the surface layer 3 in an amount of usually 5 to 200 parts by mass, preferably 15 to 130 parts by mass, with respect to 100 parts by mass of the heat-curable or energy ray-curable urethane resin contained in the surface layer resin composition. When the amount of the particles in the surface layer 3 is excessively small, the particles are scattered and this makes the electrical characteristics of the roller surface largely variable, whereas when the amount of the particles is excessively large, since the particles are poorly dispersed, the coating may become unstable depending on the case due to precipitation of the particles and the like, making the surface state of the resulting coating film surface heterogeneous, both of which cases are thus not preferred.

The average size of the particles used in the present invention is not particularly restricted; however, it may be, for example 1 to 50 μm. Further, the thickness of the surface layer 3 may be, for example, 1 to 20 μm. It is noted here that, in the present invention, the thickness of the surface layer 3 does not include the protruding parts of the particles.

Further, in the present invention, the glass transition temperature (Tg) of the particles is preferably 34° C. or higher, more preferably 50° C. or higher. The Tg and the softness of particles often correlate with each other, and particles tend to be soft when the Tg is low. As long as the Tg of the particles is 34° C. or higher, detachment of the particles due to excessive softness does not occur. In addition, since the viscosity of the particles does not increase at a use environment temperature (10 to 30° C.), even if the particles are deformed by an external force, the original shape is restored and the roller is thus not damaged.

In the roller of the present invention, the surface layer 3 may be any layer that satisfies the above-described conditions, and this enables to attain the expected effects of the present invention. In the roller of the present invention, the materials and the like of other constituents are not particularly restricted and may be appropriately selected as desired.

The shaft 1 used in the roller of the present invention is not particularly restricted as long as it has good electrical conductivity, and the shaft 1 can be selected as appropriate in accordance with the intended purpose. For example, any one of a shaft made of a metal, a shaft made of a metal that has a high-rigidity resin substrate arranged on the outer circumference, a shaft consisting of only a high-rigidity resin substrate, and a cylindrical body which is made of a metal or a high-rigidity resin and has a hollow interior may be used.

In the roller of the present invention, the material constituting the elastic layer 2 is not particularly restricted as long as it is a flexible material, such as a rubber material, a urethane material, a silicone material, a thermoplastic elastomer, or a UV-curable resin. Specifically, for example, the elastic layer 2 can be formed using an elastic layer resin composition which contains a UV-curable resin, a photopolymerization initiator and a conductive agent. The UV-curable resin is not particularly restricted, and a UV-curable resin that contains (A) a urethane (meth)acrylate oligomer and (B) a (meth)acrylate monomer can be suitably used.

The (A) urethane (meth)acrylate oligomer is a compound which has at least one acryloyl group ($CH_2=CHCOO-$) or methacryloyl group ($CH_2=C(CH_3)COO-$) and plural urethane bonds ($-NHCOO-$). The number of functional groups of this (A) urethane (meth)acrylate oligomer is preferably 3.0 or less, particularly preferably 1.5 to 2.5. The term "functional group" used herein encompasses an acryloyloxy group and a methacryloyloxy group, and the term "number of functional groups" refers to the average number of functional groups. When the number of functional groups of the (A) urethane (meth)acrylate oligomer is 3.0 or less, since the cross-linking density in the UV-curable resin is moderately increased, the acetone extraction amount can be reduced without increasing the hardness of the layer, so that an effect of improving the stain resistance against adjacent members, such as a photoreceptor, can be obtained. Meanwhile, when the (A) urethane (meth)acrylate oligomer contains a trifunctional urethane (meth)acrylate oligomer, the hardness of the layer may be increased.

The (A) urethane (meth)acrylate oligomer preferably has a number-average molecular weight of 1,000 to 100,000 in terms of polystyrene. When the molecular weight of the (A) urethane (meth)acrylate oligomer is less than 1,000, the hardness of the layer may be excessively increased, whereas when the molecular weight is higher than 100,000, since the acetone extraction amount is increased due to a small number of cross-linking points in the layer, the stain resistance against adjacent members, such as a photoreceptor, may be deteriorated.

The (A) urethane (meth)acrylate oligomer is not particularly restricted; however, for example, one which is produced by synthesizing a urethane prepolymer from a polyol and a polyisocyanate and then adding a hydroxyl group-containing (meth)acrylate to the thus obtained urethane prepolymer can be suitably used.

The polyol used for the synthesis of the urethane prepolymer is a compound which has plural hydroxyl groups (OH groups). Specific examples of such a polyol include polyether polyols, polyester polyols, polycarbonate polyols, polytetramethylene glycols, polybutadiene polyols, alkylene oxide-modified polybutadiene polyols and polyisoprene polyols, among which polyether polyols are particularly preferred. Preferred specific examples of the polyether polyols include polyoxypropylene glycols, polyoxyethylene glycols, polyoxymethylene glycols, polyoxytetramethylene glycols, and polyoxybutylene glycols. By selecting any one of these preferred polyether polyols as the polyol used for the synthesis of the urethane prepolymer, effects of, for example, reducing the electrical resistance of the layer, lowering the acetone extraction rate on the surface having a high synthesis rate and reducing the permanent compression set, can be obtained. It is noted here that the above-described polyether polyols are obtained by, for example, adding an alkylene oxide (e.g., ethylene oxide or propylene oxide) to a polyhydric alcohol (e.g., ethylene glycol, propylene glycol, or glycerin). These polyols may be used individually, or two or more thereof may be used as a blend.

The polyol used for the synthesis of the urethane prepolymer preferably has a molecular weight in a range of 500 to 15,000. When the molecular weight of the polyol used for the synthesis of the urethane prepolymer is less than 500, the hardness of the layer is increased, making the layer unsuitable as a layer of a charging roller, whereas when the molecular weight is higher than 15,000, the acetone extraction amount is increased, so that the stain resistance against adjacent members, such as a photoreceptor, may be deteriorated.

The polyisocyanate used for the synthesis of the urethane prepolymer is a compound which has plural isocyanate groups (NCO groups). Specific examples of such a polyisocyanate include tolylene diisocyanate (TDI), diphenylmethane diisocyanate (MDI), crude diphenylmethane diisocyanate (crude MDI), isophorone diisocyanate (IPDI), hydrogenated diphenylmethane diisocyanate, hydrogenated tolylene diisocyanate and hexamethylene diisocyanate (HDI), as well as isocyanurate modification products, carbodiimide modification products and glycol modification products thereof. These polyisocyanates may be used individually, or two or more thereof may be used as a blend.

The urethane prepolymer has an isocyanate index of preferably in a range of 110 to 200, more preferably in a range of 115 to 200. The term "isocyanate index" means a value calculated by (B/A)×100, where the number of OH groups in the polyol is A, and the number of NCO groups in the polyisocyanate is B. When the isocyanate index of the urethane prepolymer is lower than 110, the compression set is increased and image defects are thus likely to occur, whereas when the isocyanate index is higher than 200, the amount of isocyanate that does not react with the polyol increases, so that the physical properties are deteriorated.

In the synthesis of the urethane prepolymer, it is preferred to use a catalyst for urethanization reaction. Examples of the catalyst for urethanization reaction include organic tin compounds, such as dibutyl tin dilaurate, dibutyl tin diacetate, dibutyl tin thiocarboxylate, dibutyl tin dimaleate, dioctyl tin thiocarboxylate, tin octanoate, and monobutyl tin oxide; inorganic tin compounds, such as stannous chloride; organic lead compounds, such as lead octanoate; monoamines, such as triethylamine and dimethylcyclohexylamine; diamines, such as tetramethylethylenediamine, tetramethylpropanediamine, and tetramethylhexanediamine; triamines, such as pentamethyldiethylene triamine, pentamethyldipropylene triamine, and tetramethylguanidine; cyclic amines, such as triethylenediamine, dimethylpiperazine, methylethylpiperazine, methylmorpholine, dimethylaminoethylmorpholine, dimethylimidazole, and pyridine; alcohol amines, such as dimethylaminoethanol, dimethylaminoethoxyethanol, trimethylaminoethylethanolamine, methylhydroxyethylpiperazine, and hydroxyethyl morpholine; ether amines, such as bis(dimethylaminoethyl)ether and ethylene glycol bis(dimethyl) aminopropyl ether; organic sulfonic acids, such as p-toluenesulfonic acid, methanesulfonic acid, and fluorosulfuric acid; inorganic acids, such as sulfuric acid, phosphoric acid, and perchloric acid; bases, such as sodium alcoholate, lithium hydroxide, aluminum alcoholate, and sodium hydroxide; titanium compounds, such as tetrabutyl titanate, tetraethyl titanate, and tetraisopropyl titanate; bismuth compounds; and quaternary ammonium salts. Among these catalysts, organic tin compounds are preferred. These catalysts may be used individually, or two or more thereof may be used in combination. The amount of the catalyst(s) to be used is preferably in a range of 0.001 to 2.0 parts by mass with respect to 100 parts by mass of the polyol.

The hydroxyl group-containing (meth)acrylate added to the urethane prepolymer is a compound which has at least one hydroxyl group and at least one acryloyloxy group ($CH_2$=CHCOO—) or methacryloyloxy group ($CH_2$=C($CH_3$)COO—). Such a hydroxyl group-containing (meth) acrylate can be added to an isocyanate group of the urethane prepolymer. Examples of the hydroxyl group-containing (meth)acrylate include 2-hydroxyethyl (meth)acrylate and 2-hydroxypropyl (meth)acrylate. These hydroxyl group-containing (meth)acrylates may be used individually, or two or more thereof may be used in combination.

The (B) (meth)acrylate monomer is a monomer which has at least one acryloyl group ($CH_2$=CHCOO—) or methacryloyl group ($CH_2$=C($CH_3$)COO—). This (B) (meth)acrylate monomer functions as a reactive diluent. In other words, the (B) (meth)acrylate monomer not only is cured by UV, but also is capable of reducing the viscosity of the composition used for the formation of the surface layer.

The number of functional groups of the (B) (meth) acrylate monomer is preferably 3.0 or less, particularly preferably 1 to 2. The term "functional group" used herein encompasses an acryloyl group and a methacryloyl group, and the term "number of functional groups" refers to the average number of functional groups. When the number of functional groups of the (B) (meth)acrylate monomer is 3.0 or less, since the cross-linking density in the UV-curable resin is moderately increased, the acetone extraction amount can be reduced without increasing the hardness of the layer, so that an effect of improving the stain resistance against adjacent members, such as a photoreceptor, can be obtained. Further, when the (B) (meth)acrylate monomer contains a bifunctional (meth)acrylate monomer, the content of (meth)acrylate monomer in the total amount of the (A) urethane (meth)acrylate oligomer and the (B) (meth)acrylate monomer is preferably from 0 to 40% by mass. When the content of (meth)acrylate monomer is higher than 40% by mass, the amount of residual monomers is increased and this leads to an increase in the acetone extraction amount, so that the stain resistance against adjacent members, such as a photoreceptor, may be deteriorated.

The (B) (meth)acrylate monomer preferably has a glass transition temperature (Tg) of not higher than 50° C. so as not to increase the hardness of the layer.

Examples of the (B) (meth)acrylate monomer include lauryl (meth)acrylate, isomyristyl (meth)acrylate, methoxytriethylene glycol (meth)acrylate, triethylene glycol di(meth)acrylate, β-(meth)acryloyloxyethyl hydrogen succinate, isobornyl (meth)acrylate, ethyl (meth)acrylate, isobutyl (meth)acrylate, n-butyl (meth)acrylate, isoamyl (meth) acrylate, glycidyl (meth)acrylate, butoxyethyl (meth) acrylate, ethoxydiethylene glycol (meth)acrylate, methoxydipropylene glycol (meth)acrylate, phenoxyethyl (meth)acrylate, 2-hydroxyethyl (meth)acrylate, and 2-hydroxypropyl (meth)acrylate. These (B) (meth)acrylate monomers may be used individually, or two or more thereof may be used in combination.

As the photopolymerization initiator used in the elastic layer 2, the same one as the one used in the surface layer 3 can be used, and it is not particularly restricted. Further, the amount of the photopolymerization initiator to be incorporated can also be selected as appropriate in the same range as in the case of the surface layer 3.

The conductive agent used in the elastic layer 2 has a function of imparting the elastic layer with electrical conductivity. As the conductive agent, the same ones as those that may be used in the surface layer resin composition can be used as appropriate.

Thereamong, in the present invention, for example, sodium perchlorate (MP-100, manufactured by Showa Chemical Industry Co., Ltd.) and an acrylic monomer solution of lithium imide (SANKONOL MTGA-50R, manufactured by Sanko Chemical Industry Co., Ltd.) can be suitably used as the ion conductive agent. These conductive agents may be used individually, or two or more thereof may be used in combination. The amount of the conductive agent(s) to be incorporated into the elastic layer resin composition varies depending on the type(s) thereof; however, it is preferably in a range of 0.1 to 10.0 parts by mass, particularly preferably in a range of 0.4 to 7.0 parts by mass, with respect to a total of 100 parts by mass of the (A) urethane (meth)acrylate oligomer and the (B) (meth)acrylate monomer that constitute the UV-curable resin.

In the elastic layer resin composition, in addition to the above-described additives, a variety of known additives can be incorporated in the same manner as in the case of the surface layer, as long as the expected effects of the present invention are not impaired. In the present invention, the thickness of the elastic layer 2 is preferably 0.5 to 4 mm.

The roller of the present invention can be produced by sequentially forming the elastic layer 2 and the surface layer 3 on the outer circumference of the shaft 1.

Specifically, first, the elastic layer 2 is formed by coating the outer circumference of the shaft 1 with the elastic layer resin composition and then curing the elastic layer resin composition by UV irradiation.

Next, the particle resin composition containing a urethane (meth)acrylate is heat-cured to prepare particles (particle preparation step). Subsequently, the outer circumference of the above-formed elastic layer 2 is coated with a mixture obtained by mixing the thus obtained particles and the surface layer resin composition containing a heat-curable or energy ray-curable urethane resin, after which the coated mixture is cured by heating or energy ray irradiation to form the surface layer 3 (surface layer formation step), whereby the roller of the present invention can be obtained. In this process, as described above, the surface layer 3 is preferably formed by curing, with energy ray irradiation, a mixture obtained by mixing the above-described particles and the surface layer resin composition containing an energy ray-curable urethane resin.

In the present invention, examples of a method of applying the resin compositions for the formation of the respective layers to the outer circumference of the shaft or the like include a spraying method, a roll coating method, a dipping method, a die coating method, a spin coating method, a dispensing method, and an extrusion method.

Further, in the present invention, the light source used for the energy ray irradiation is not particularly restricted, and examples thereof include a mercury lamp, a high-pressure mercury lamp, an ultrahigh-pressure mercury lamp, a metal halide lamp, and a xenon lamp. In the energy ray irradiation, the irradiation conditions such as irradiation intensity and integral light intensity are not particularly restricted and can be selected as appropriate in accordance with, for example, the components contained in the resin compositions used for the formation of the respective layers, the formulations of the resin compositions, and the amounts of the resin compositions to be applied.

EXAMPLES

The present invention will now be described in more detail by way of examples thereof.

Examples 1 to 10 and Comparative Examples 1 to 7

The materials shown in Table 1 below were kneaded using a planetary mixer at 60 rpm for 1 hour to prepare an elastic layer resin composition. The thus obtained elastic layer resin composition was applied to the outer circumference of a shaft (outer diameter: 8 mm, material: SUS) by traverse coating using a die coater. While rotating the thus coated shaft, the coated shaft was irradiated with UV radiation for 5 seconds using an electrodeless UV lamp equipped with an H bulb (manufactured by Fusion UV Systems, Inc.), whereby an elastic layer having a thickness of about 2.0 mm was formed.

TABLE 1

|  | Manufacturer name | Product name | Parts by mass |
|---|---|---|---|
| Urethane acrylate oligomer | Asia Industry Co., Ltd. | NX44-31 | 80 |
| Acrylic monomer | Kyoeisha Chemical Co., Ltd. | LIGHT ESTER HOA | 20 |
| Ion conductive agent | Sanko Chemical Industry Co., Ltd. | SANKONOL MTGA-50R | 0.5 |
| Photoinitiator | BASF Japan Ltd. | IRGACURE 184 | 0.5 |

In accordance with the respective formulations shown in Tables 2 to 4 below, surface layer resin compositions were prepared in the same manner as described above. Then, each of the thus obtained surface layer resin compositions was mixed with particles to prepare a mixture and, using a roll coater, this mixture was applied by traverse coating to the outer circumference of the shaft on which the elastic layer had been formed. While rotating the thus coated shaft, the coated shaft was irradiated with UV light for 5 seconds using an electrodeless UV lamp equipped with an H bulb (manufactured by Fusion UV Systems, Inc.) to form a surface layer having a thickness of 5 μm, whereby each roller of Examples and Comparative Examples were obtained.

(Elongation)

As for the tensile elongation at break of each surface layer resin composition, a 1 mm-thick cured sample of each of the surface layer resin compositions of Examples and Comparative Examples was punched out using Super Dumbbell Cutter SDMK-1000-D manufactured by Dumbbell Co., Ltd., and the elongation (%) thereof at tensile brake was measured in accordance with JIS K6251.

(Reaction Force Under 1-μm Compression)

The reaction force of the respective particles under 1-μm compression was measured by compressing the particles in the vertical direction at 100 mN/60 s using a Fischer hardness meter along with INDENTER HALTOR as a compression terminal.

(Crack Test)

The presence or absence of cracks was evaluated based on the following criteria by compressing each of the thus obtained rollers of Examples and Comparative Examples with a 3 cm×3 cm block under a load. Verification of cracks was performed under a microscope at a magnification of ×500. The results thereof are together shown in Tables 2 to 4 below: where ○: The roller was not damaged under a load of 350 N; and x: A crack(s) was/were generated in the compressed part under a load of 350 N.

(Abrasion Test Evaluation Method)

Figure 2:
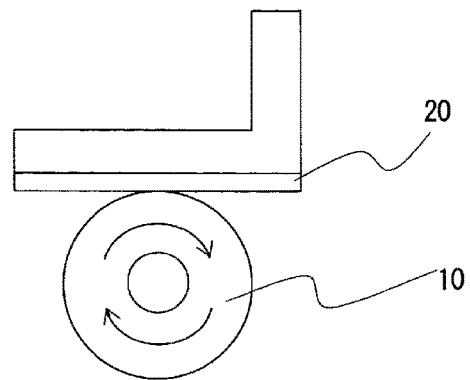
FIG. 2 is a drawing schematically illustrating a method of the abrasion test conducted in Examples.

For each of the thus obtained rollers of Examples and Comparative Examples, an abrasion test was conducted to evaluate the state of scraping and detachment of the particles. Specifically, as illustrated in FIG. 2, the roller 10 was rotated at 300 rpm for 10 minutes with a load being applied thereto by pressing thereagainst an SUS plate 20 (5 cm×5 cm, mass: 300 g) from the radial outer side, after which scraping of the particles as well as detachment of the particles were verified under a microscope (magnification: ×500). Generally speaking, when the particles are hard, it is believed that scraping of the particles is more likely to occur since the resin portion covering the particles is abrased first and then the particles themselves are abrased. On the other hand, when the particles are soft, it is believed that detachment of the particles is more likely to occur since the resin portion surrounding the particles is largely distorted and this causes destruction of the resin portion.

Scraping of the particles and detachment of particles were evaluated based on the following criteria, and the results thereof are together shown in Tables 2 to 4 below.

(Evaluation of Scraping of Particles)

Figure 3:
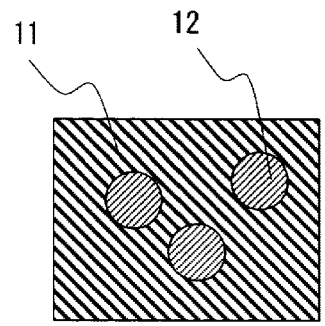
FIGS. 3A to 3E are drawings illustrating the criteria for evaluating the scraping state of particles in Examples.
Figure 3:
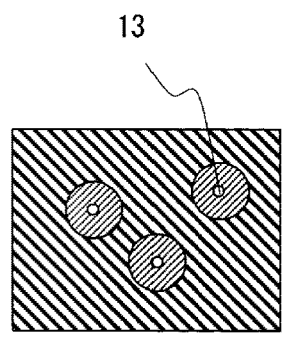
Figure 3:
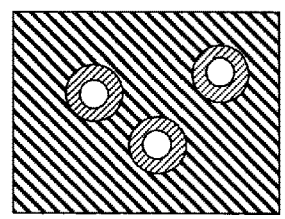
Figure 3:
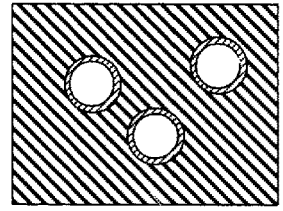
Figure 3:
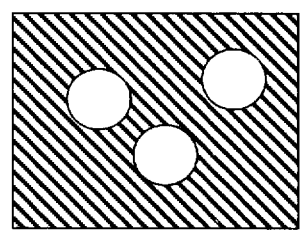

The surface of each roller was observed under a microscope from the upper side, and the state of scraping of particles 12 embedded in a resin portion 11 of the surface layer was evaluated based on the criteria illustrated in FIGS. 3A to 3E. In FIGS. 3A to 3E, the particles 12 and the resin portion 11 are distinguished for descriptive purposes; however, the particles 12 are coated with a resin in the initial state. The solid-white parts represented by symbol 13 indicate the scraped parts. An evaluation of "○" was given when the particles 12 were intact (visual surface area: 90% to 100%) as illustrated in FIG. 3A; an evaluation of "○Δ" was given when the particles 12 were slightly scraped off but the cross-sectional heights of the particles 12 were hardly changed (visual surface area: 70% to less than 90%) as illustrated in FIG. 3B; an evaluation of "Δ" was given when the particles 12 were scraped off to such an extent that the cross-sectional heights of the particles 12 were changed (visual surface area: 50% to less than 70%) as illustrated in FIG. 3C; an evaluation of "Δx" was given when the majority of the particles 12 was scraped off (visual surface area: 20% to less than 50%) as illustrated in FIG. 3D; and an evaluation of "x" was given when the particles 12 were completely scraped off (visual surface area: 0% to less than 20%) as illustrated in FIG. 3E.

(Evaluation of Detachment of Particles)

The surface of each roller was visually observed and evaluated based on the following criteria:

○: No particle detachment was observed at all;
○Δ: Particle detachment occurred at a barely visible level;
Δ: Particle detachment was visually confirmed, but at a minor level;
x: Particles were clearly detached; and
xx: Particles were severely detached.

TABLE 2

|  |  |  | Elongation at break (%) | Reaction force (mN) | Tg of particles (° C.) | Example 1 | Example 2 | Example 3 | Example 4 | Example 5 | Example 6 |
|---|---|---|---|---|---|---|---|---|---|---|---|
| Surface layer resin composition | Energy ray/heat-curable resin | Urethane acrylate*1 | 70 |  |  | 100 | 100 | 100 | 100 | 100 | 100 |
|  |  | Urethane acrylate*2 | 100 |  |  |  |  |  |  |  |  |
|  |  | Urethane acrylate*3 | 80 |  |  |  |  |  |  |  |  |
|  |  | Urethane acrylate*4 | 120 |  |  |  |  |  |  |  |  |
|  |  | Urethane acrylate*5 | 30 |  |  |  |  |  |  |  |  |
|  |  | Urethane acrylate*6 | 50 |  |  |  |  |  |  |  |  |
|  | Photo-polymerization initiator | Irg. 907*7 |  |  |  | 1 | 1 | 1 | 1 | 1 | 1 |
|  | Carbon black | A223*8 |  |  |  | 20 | 20 | 20 | 20 | 20 | 20 |
| Particle |  | CE300*9 |  | 1.0 | 34 | 50 |  |  |  |  |  |
|  |  | UCN5200D(H10)*10 |  | 1.9 | 51 |  | 50 |  |  |  |  |
|  |  | UCN5200D(H20)*11 |  | 2.3 | 75 |  |  | 50 |  |  |  |
|  |  | SP20*12 |  | 2.1 | 85 |  |  |  | 50 |  |  |
|  |  | MZ20HN*13 |  | 6.7 | 50 |  |  |  |  | 50 |  |
|  |  | ABX20*14 |  | 2.2 | >100 |  |  |  |  |  | 50 |
|  |  | GS350T*15 |  | 10.3 | >100 |  |  |  |  |  |  |
|  |  | JB300*16 |  | 0.4 | −52 |  |  |  |  |  |  |
|  |  | AK300*17 |  | 0.4 | −34 |  |  |  |  |  |  |
|  |  | C300*18 |  | 0.5 | −13 |  |  |  |  |  |  |
|  |  | GR300*19 |  | 10.5 | >100 |  |  |  |  |  |  |
|  |  | LPS-20C*20 |  | 12.1 | >100 |  |  |  |  |  |  |
|  | Presence or absence of cracks |  |  |  |  | ○ | ○ | ○ | ○ | ○ | ○ |
| Abrasion test | Scraping of particles |  |  |  |  | ○ | ○Δ | ○Δ | ○Δ | Δ | ○Δ |
|  | Detachment of particles |  |  |  |  | ○Δ | ○Δ | ○Δ | ○ | ○ | ○ |

*1SN34 (urethane acrylate (ester-based, using an aromatic isocyanate)), manufactured by Asia Industry Co., Ltd.
*2NX44-31 (urethane acrylate (PPG (polypropylene glycol)-based, using an aliphatic isocyanate)), manufactured by Asia Industry Co., Ltd.
*3PX31-76 (urethane acrylate (PTMG (polytetramethylene glycol)-based, using an aliphatic isocyanate)), manufactured by Asia Industry Co., Ltd.
*4PX31-77 (urethane acrylate (PTMG-based, using an aromatic isocyanate)), manufactured by Asia Industry Co., Ltd.
*5PX31-69 (urethane acrylate (PPG-based, using an aliphatic isocyanate)), manufactured by Asia Industry Co., Ltd.
*6UX33-1 (urethane acrylate (PPG-based, using an aliphatic isocyanate)), manufactured by Asia Industry Co., Ltd.
*7manufactured by BASF Japan Ltd.
*8manufactured by Mikuni Color Ltd.
*9CE300 (particles containing a heat-curable polyurethane resin as a main component, average particle size: 20 μm) (manufactured by Negami Chemical Industrial Co., Ltd.)
*10UCN5200D(H10) (particles containing a heat-curable polyurethane resin as a main component, average particle size: 20 μm) (manufactured by Dainichiseika Color & Chemicals Mfg. Co., Ltd.)
*11UCN5200D(H20) (particles containing a heat-curable polyurethane resin as a main component, average particle size: 20 μm) (manufactured by Dainichiseika Color & Chemicals Mfg. Co., Ltd.)
*12SP20 (particles containing a nylon resin as a main component, average particle size: 30 μm) (manufactured by Toray Industries, Inc.)
*13MZ20HN (particles containing an acrylic resin as a main component, average particle size: 20 μm) (manufactured by Soken Chemical & Engineering Co., Ltd.)
*14ABX20 (particles containing an acrylic resin as a main component, average particle size: 20 μm) (manufactured by Sekisui Chemical Co., Ltd.)
*15GS350T (particles containing an acryl-styrene resin as a main component, average particle size: 30 μm) (manufactured by Negami Chemical Industrial Co., Ltd.)
*16JB300 (particles containing a heat-curable polyurethane resin as a main component, average particle size: 20 μm) (manufactured by Negami Chemical Industrial Co., Ltd.)
*17AK300 (particles containing a heat-curable polyurethane resin as a main component, average particle size: 20 μm) (manufactured by Negami Chemical Industrial Co., Ltd.)
*18C300 particles containing a heat-curable polyurethane resin as a main component, average particle size: 20 μm) (manufactured by Negami Chemical Industrial Co., Ltd.)
*19GR300 (particles containing an acrylic resin as a main component, average particle size: 20 μm) (manufactured by Negami Chemical Industrial Co., Ltd.)
*20LPS-20C (particles containing a phenol resin as a main component, average particle size: 20 μm) (manufactured by Lignyte Inc.)

TABLE 3

|  |  |  | Elongation at break (%) | Reaction force (mN) | Tg of particles (° C.) | Example 7 | Example 8 | Example 9 | Example 10 | Comparative Example 1 | Comparative Example 2 |
|---|---|---|---|---|---|---|---|---|---|---|---|
| Surface layer resin composition | Energy ray/heat-curable resin | Urethane acrylate*1 | 70 |  |  | 100 |  |  |  | 100 | 100 |
|  |  | Urethane acrylate*2 | 100 |  |  |  | 100 |  |  |  |  |
|  |  | Urethane acrylate*3 | 80 |  |  |  |  | 100 |  |  |  |
|  |  | Urethane acrylate*4 | 120 |  |  |  |  |  | 100 |  |  |
|  |  | Urethane acrylate*5 | 30 |  |  |  |  |  |  |  |  |
|  |  | Urethane acrylate*6 | 50 |  |  |  |  |  |  |  |  |
|  | Photo-polymerization initiator | Irg 907*7 |  |  |  | 1 | 1 | 1 | 1 | 1 | 1 |
|  | Carbon black | A223*8 |  |  |  | 20 | 20 | 20 | 20 | 20 | 20 |
| Particle |  | CE300*9 |  | 1.0 | 34 |  |  |  |  |  |  |
|  |  | UCN5200D(H10)*10 |  | 1.9 | 51 |  |  |  |  |  |  |

TABLE 3-continued

| | Elongation at break (%) | Reaction force (mN) | Tg of particles (° C.) | Example 7 | Example 8 | Example 9 | Example 10 | Comparative Example 1 | Comparative Example 2 |
|---|---|---|---|---|---|---|---|---|---|
| UCN5200D(H20)*11 | | 2.3 | 75 | | | | | | |
| SP20*12 | | 2.1 | 85 | | | | | | |
| MZ20HN*13 | | 6.7 | 50 | | | | | | |
| ABX20*14 | | 2.2 | >100 | | 50 | 50 | 50 | | |
| GS350T*15 | | 10.3 | >100 | 50 | | | | | |
| JB300*16 | | 0.4 | −52 | | | | | 50 | |
| AK300*17 | | 0.4 | −34 | | | | | | 50 |
| C300*18 | | 0.5 | −13 | | | | | | |
| GR300*19 | | 10.5 | >100 | | | | | | |
| LPS-20C*20 | | 12.1 | >100 | | | | | | |
| Presence or absence of cracks | | | | ○ | ○ | ○ | ○ | ○ | ○ |
| Abrasion test   Scraping of particles | | | | Δ | ○Δ | ○Δ | ○Δ | ○ | ○ |
| Detachment of particles | | | | ○ | Δ | Δ | ○Δ | XX | X |

TABLE 4

| | | | Elongation at break (%) | Reaction Force (mN) | Tg of particles (° C.) | Comparative Example 3 | Comparative Example 4 | Comparative Example 5 | Comparative Example 6 | Comparative Example 7 |
|---|---|---|---|---|---|---|---|---|---|---|
| Surface layer resin composition | Energy ray/heat-curable resin | Urethane acrylate*1 | 70 | | | 100 | 100 | 100 | | |
| | | Urethane acrylate*2 | 100 | | | | | | | |
| | | Urethane acrylate*3 | 80 | | | | | | | |
| | | Urethane acrylate*4 | 120 | | | | | | | |
| | | Urethane acrylate*5 | 30 | | | | | | 100 | |
| | | Urethane acrylate*6 | 50 | | | | | | | 100 |
| | Photopolymerization initiator | Irg. 907*7 | | | | 1 | 1 | 1 | 1 | 1 |
| | Carbon black | A223*8 | | | | 20 | 20 | 20 | 20 | 20 |
| Particle | | CE300*9 | | 1.0 | 34 | | | | | |
| | | UCN5200D(H10)*10 | | 1.9 | 51 | | | | | |
| | | UCN5200D(H20)*11 | | 2.3 | 75 | | | | | |
| | | SP20*12 | | 2.1 | 85 | | | | | |
| | | MZ20HN*13 | | 6.7 | 50 | | | | | |
| | | ABX20*14 | | 2.2 | >100 | | | | 50 | 50 |
| | | GS350T*15 | | 10.3 | >100 | | | | | |
| | | JB300*16 | | 0.4 | −52 | | | | | |
| | | AK300*17 | | 0.4 | −34 | | | | | |
| | | C300*18 | | 0.5 | −13 | 50 | | | | |
| | | GR300*19 | | 10.5 | >100 | | 50 | | | |
| | | LPS-20C*20 | | 12.1 | >100 | | | 50 | | |
| Presence or absence of cracks | | | | | | ○ | ○ | ○ | X | X |
| Abrasion test | Scraping of particles | | | | | ○ | X | X | ○Δ | ○Δ |
| | Detachment of particles | | | | | X | ○ | ○ | Δ | Δ |

As shown in Tables 2 to 4 above, the rollers of Examples, in which the surface layer was constituted by a mixture of a surface layer resin composition having a prescribed tensile elongation at break and particles having a prescribed reaction force, were observed with no crack generation on the surface layer and hardly any scraping or detachment of the particles in the abrasion test; therefore, the rollers of Examples were confirmed to have excellent durability.

DESCRIPTION OF SYMBOLS

1: shaft
2: elastic layer
3: surface layer
10: charging roller
11: resin portion
12: particle
13: scraped part
20: SUS plate

The invention claimed is:

1. A charging roller comprising:
a shaft; and
an elastic layer and a surface layer which are sequentially formed on the outer circumference of the shaft,
wherein the surface layer is composed of a mixture of a surface layer resin composition and particles,
the surface layer resin composition has a tensile elongation at break of 51% or greater,
the particles have a reaction force of 1.0 to 10.3 mN under 1-μm compression, and
the surface layer resin composition comprises a urethane resin composed of a polyol having an ester skeleton and an isocyanate having an aromatic ring.

2. The charging roller according to claim 1, wherein the particles have a glass transition temperature (Tg) of 34° C. or higher.

* * * * *